(12) United States Patent
Schlosser et al.

(10) Patent No.: US 7,089,958 B2
(45) Date of Patent: Aug. 15, 2006

(54) DAMPER VANE

(75) Inventors: Robert E. Schlosser, Crystal, MN (US); Robert C. Knutson, Minnetonka, MN (US); Dennis R. Grabowski, Champlin, MN (US); Greg T. Mrozek, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 250 days.

(21) Appl. No.: 10/632,513

(22) Filed: Aug. 1, 2003

(65) Prior Publication Data
US 2005/0022880 A1    Feb. 3, 2005

(51) Int. Cl.
F16K 11/22    (2006.01)
F16K 1/22    (2006.01)

(52) U.S. Cl. .......... 137/601.11; 137/601.13; 251/305; 454/278

(58) Field of Classification Search .......... 137/601.05, 137/601.11, 601.13, 599.1, 601.09; 251/129.11, 251/305; 454/278, 284
See application file for complete search history.

(56) References Cited

U.S. PATENT DOCUMENTS

| | | | | |
|---|---|---|---|---|
| 3,049,985 A | * | 8/1962 | Klingberg | 137/601.11 |
| 3,261,373 A | * | 7/1966 | Ridenour | 137/601.11 |
| 3,442,489 A | * | 5/1969 | Cary et al. | 251/305 |
| 4,541,328 A | * | 9/1985 | Brzezinski et al. | 454/336 |
| 4,850,319 A | * | 7/1989 | Imoehl | 251/129.11 |
| 4,917,350 A | * | 4/1990 | Beyer et al. | 251/129.11 |
| 5,102,097 A | * | 4/1992 | Davis et al. | 251/283 |
| 5,465,756 A | * | 11/1995 | Royalty et al. | 137/625.31 |
| 5,740,785 A | * | 4/1998 | Dickey et al. | 251/305 |
| 5,765,592 A | * | 6/1998 | Karlicek | 137/601.06 |
| 2003/0213852 A1 | | 11/2003 | Demster | |
| 2003/0213853 A1 | | 11/2003 | Demster | |
| 2004/0007001 A1 | | 1/2004 | Demster | |
| 2004/0007627 A1 | | 1/2004 | Demster | |

OTHER PUBLICATIONS

"Small Precision Motor—PM42L-048," *Minebea Electronics Co., Ltd.*, 1 pg. ( © 2001-2002).

* cited by examiner

Primary Examiner—Stephen M. Hepperle
(74) Attorney, Agent, or Firm—Gregory M. Ansems

(57) ABSTRACT

A damper unit for an air circulation system. The damper unit includes a frame defining an air flow opening, a damper vane for opening and closing the air flow opening, and a drive mechanism for turning the damper vane between the open and closed positions. The vane of the damper unit includes a main body and vane turning surfaces that project outwardly from the main body. The vane turning surfaces are configured for converting air flow into torque for assisting the drive mechanism in turning the damper vane between the open and closed positions.

21 Claims, 17 Drawing Sheets

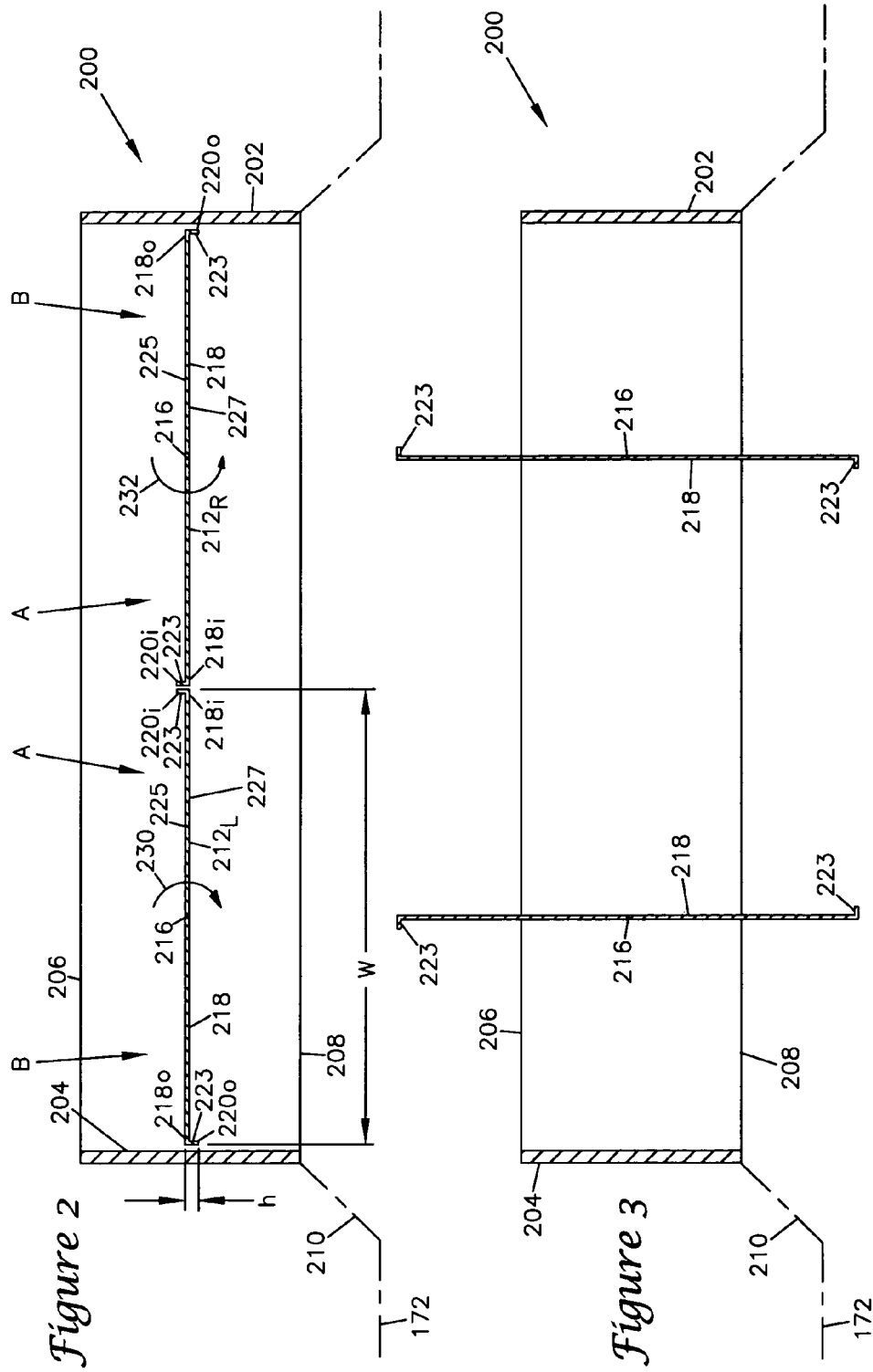

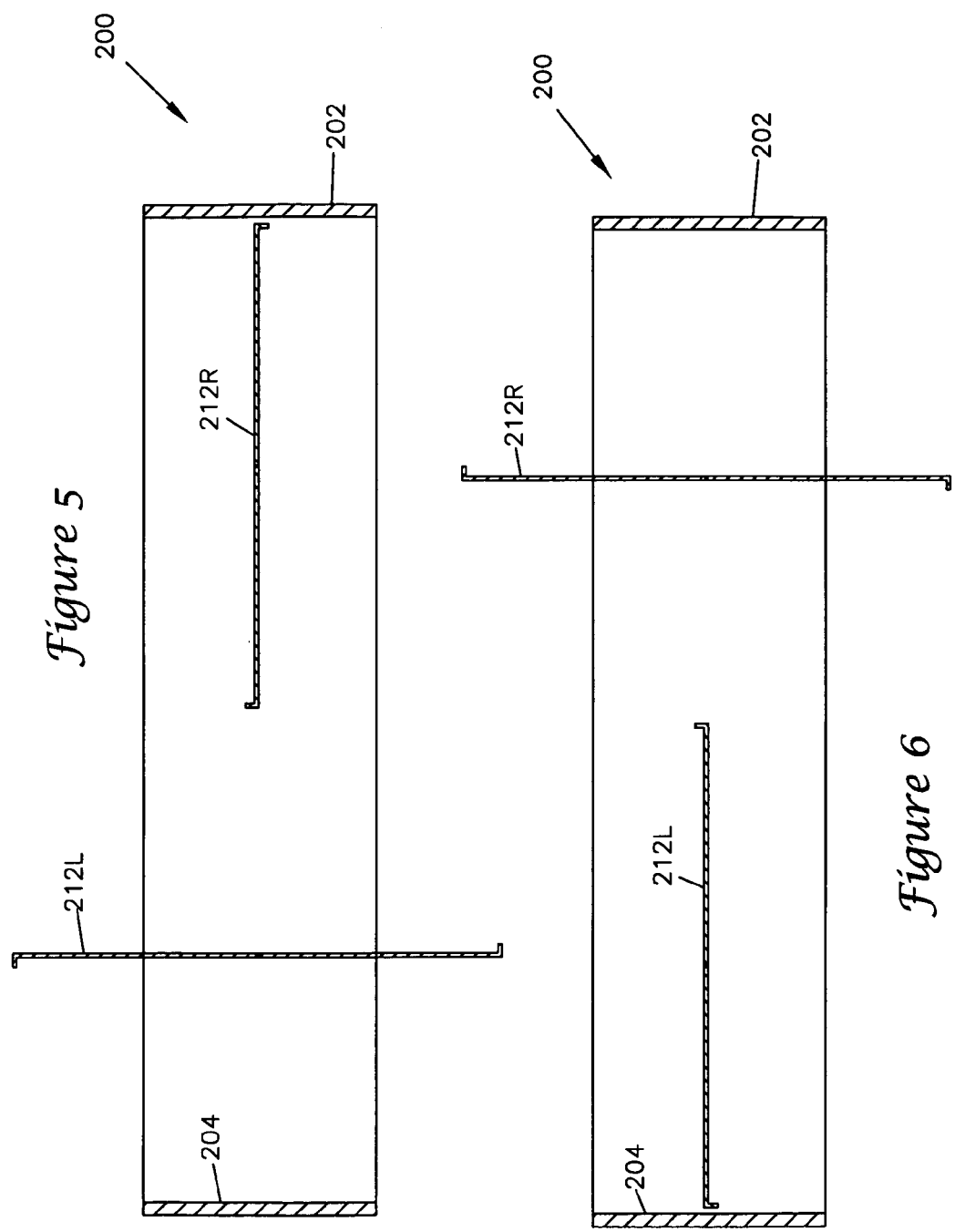

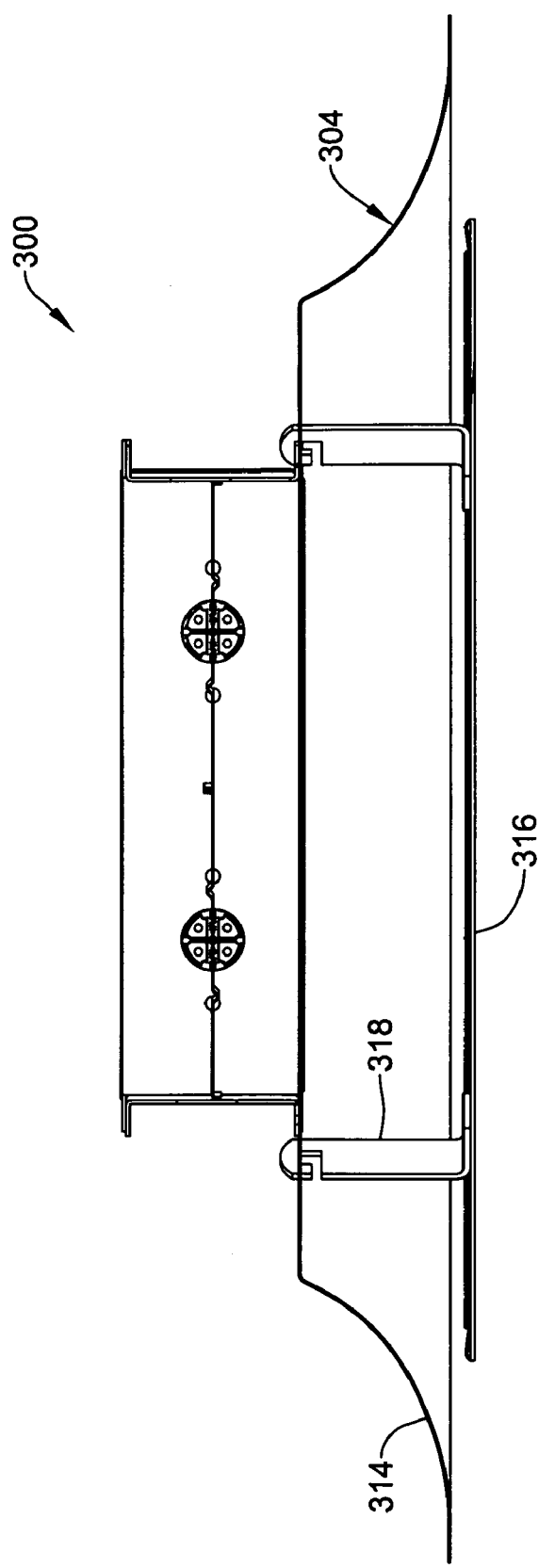

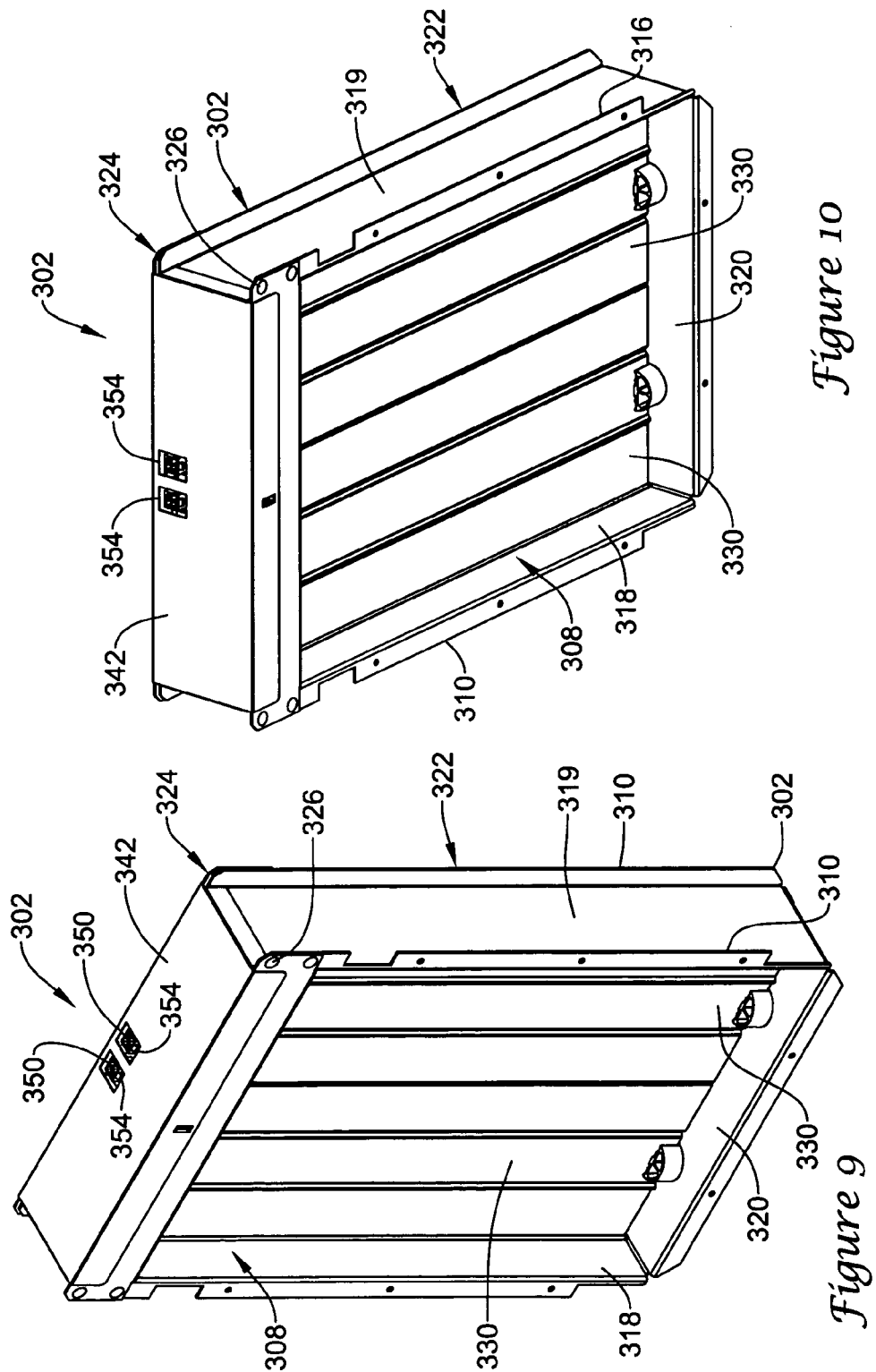

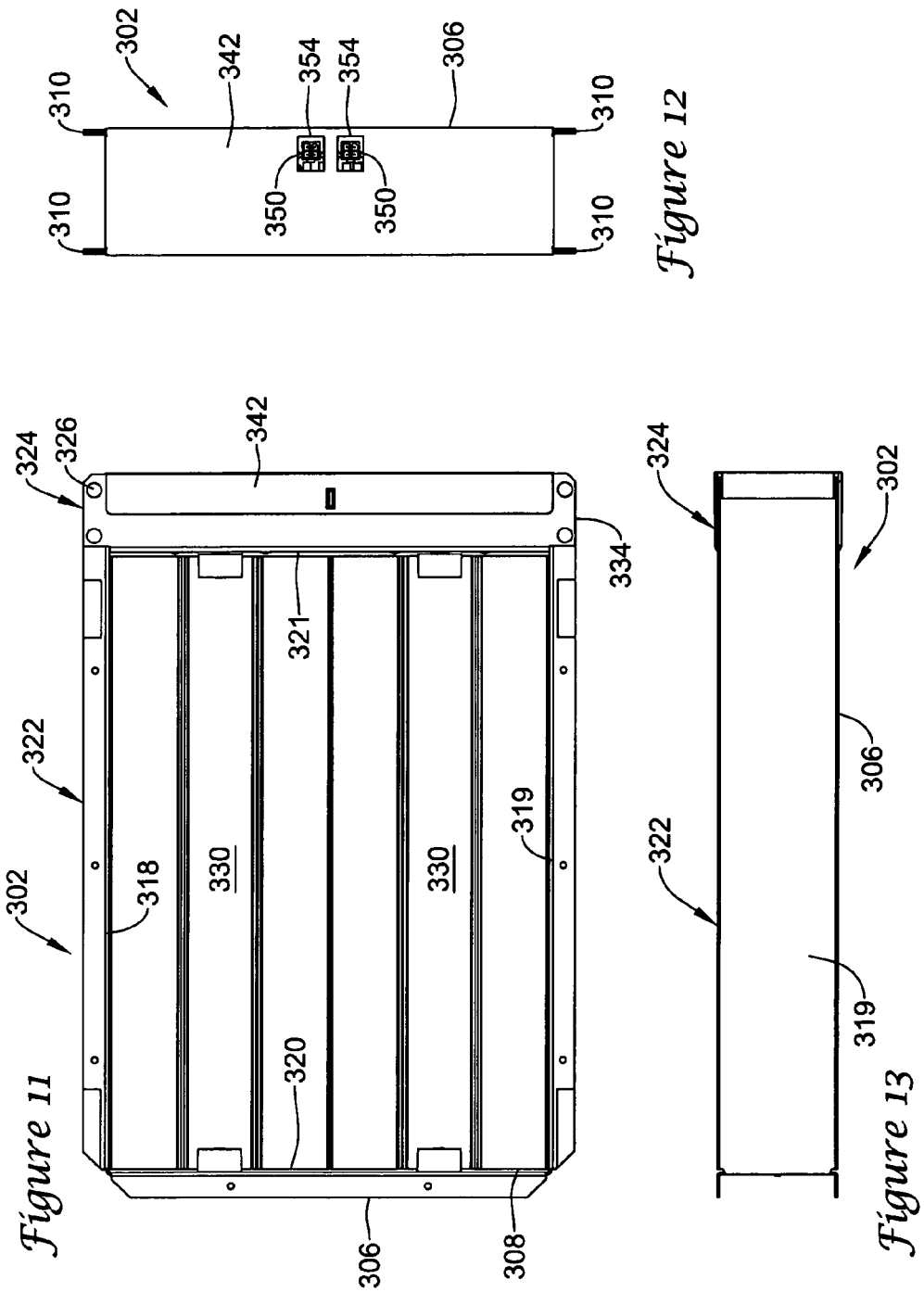

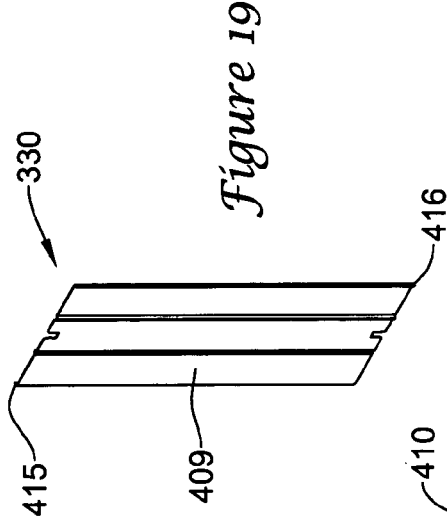
*Figure 19*
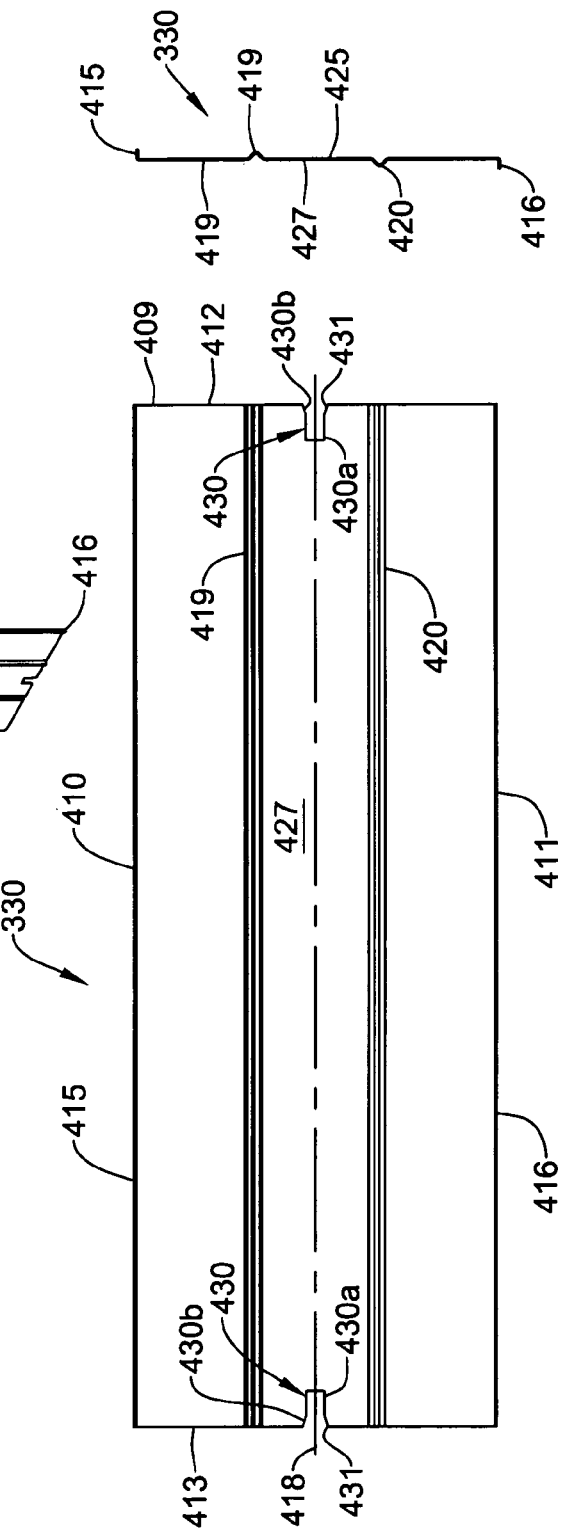
*Figure 20*
*Figure 21*

DAMPER VANE

TECHNICAL FIELD

The present invention generally relates to heating, ventilating, and air-conditioning systems. More particularly, the present invention relates to damper devices and damper vanes for use in controlling air flow in an air circulation system.

BACKGROUND

Heating, ventilating, and air-conditioning (HVAC) systems are commonly used to condition the air inside commercial and residential buildings. A typical HVAC system includes a furnace to supply heated air and an air-conditioner to supply cooled air to the building.

A system of ducts is typically used to route the heated or cooled air from the furnace or air-conditioner to various points within the building. For example, supply ducts can be run from an air-conditioner to one or more rooms in a building to provide cooled air to the rooms. In larger buildings, the ducts typically terminate in the space above a false ceiling, and a diffuser assembly is positioned within the false ceiling to deliver the conditioned air from the duct into the room of the structure. In addition, return ducts can be used to return air from the rooms to the air-conditioner or furnace for cooling or heating.

Damper assemblies are commonly used to control air flow through HVAC ducts. For example, a damper assembly can be used to restrict air flowing through a duct until the HVAC system determines that conditioned air needs to be provided to a room within the structure. The HVAC system can then, for example, turn on the air-conditioner blower and open the damper assembly to allow air to be forced through the duct and diffuser assembly into the room.

In large structures such as office buildings, the building can be divided into a series of zones so that conditioned air is only provided to a specific zone as needed. For example, each zone can include its own series of ducts, and damper assemblies can be positioned at a source of each series of ducts to open and close as necessary to deliver conditioned air to one or more of the ducts. In this manner, separate zones can be conditioned separately as desired.

While existing HVAC systems effectively provide conditioned air throughout a structure, such systems can be expensive to build and maintain. For example, initially duct work must be run from the HVAC system source (e.g., furnace or air-conditioner) to each separate point at which conditioned air is to be provided. Further, depending on how each "zone" within a structure is configured, it may be difficult to provide desired conditioning to a specific area of a building. For example, if the zones are too large in size, it may be difficult to provide the correct mixture of conditioned air for a given zone. In addition, if the rooms within a building are reconfigured after the HVAC system has been installed, it may be necessary to reroute existing duct work to provide a desired level of conditioning for the new configuration of rooms.

To overcome the problems associated with conventional HVAC systems, a so-called "duct-less" HVAC system has been developed. FIG. 1 schematically shows an example of this type of system 100. The system 100 includes an air supply plenum 120, an air return plenum 130, and a conventional air conditioning unit 110. The air supply plenum 120 is positioned above a floor space 159 desired to be cooled, and is separated from the floor space 159 by a barrier such as a suspended ceiling 172. The air return plenum 130 is positioned above the air supply plenum 120 and is separated from the air supply plenum 120 by a barrier layer 174. Air return conduits 125 pass through the air supply plenum 120 to provide fluid communication between the conditioned floor space 159 and the return plenum 130. The air conditioner 110 provides conditioned air to the air supply plenum 120 via air supply conduits 115 that pass through the return plenum 130.

The air supply plenum 120 is adapted to provide conditioned air to multiple zones 160A, 160B of the floor space 159. A separate damper or dampers 150A, 150B are provided for each of the different zones 160A, 160B. Zone 160A is cooled by opening damper 150A such that cool air flows from the air supply plenum 120 into the zone 160A. Similarly, to cool the zone 160B, the damper 150B is opened thereby allowing cool air from the air supply plenum 120 to flow into the zone 160B.

While the floor space 159 is shown divided into two regions 160A, 160B, it will be appreciated that in normal applications the given floor space may have a much larger number of zones. For example, in a given floor space of a building, each room of the building may be designated as a different zone thereby allowing the temperature of each room to be independently controlled. Also, while FIG. 1 shows a single floor space, in multi-floor buildings, the return and supply plenums can be positioned between the floors of the building.

In the system of FIG. 1, the air temperature and air pressure within the air supply plenum 120 are maintained at selected constant values. The supply plenum 120 preferably overlies the entire floor space of the building, and provides conditioned air to all of the zones of the floor space. Therefore, separate lines of ductwork are not required to be installed for each zone. This reduction in ductwork assists in reducing original construction costs and also reduces costs associated with reconfiguring a given floor plan.

SUMMARY

One inventive aspect of the present disclosure relates to damper devices adapted for use with air-plenum type air handling systems.

Another inventive aspect of the present disclosure relates to damper vanes that can be turned between open and closed positions with a reduced amount of torque.

A further inventive aspect of the present disclosure relates to damper vanes shaped to utilize air flow across the vanes to generate supplemental torque for assisting in turning the vanes between open and closed positions.

Examples of a variety of inventive aspects in addition to those described above are set forth in the description that follows. It is to be understood that both the foregoing general description and the following detailed description are exemplary and explanatory only and are not restrictive of the broad inventive aspects that underlie the examples disclosed herein.

BRIEF DESCRIPTION OF THE DRAWINGS

FIG. 2 illustrates an air-handling device having features that are examples of how inventive aspects in accordance with the principles of the present disclosure may be practiced, damper vanes of the device are shown in a closed position;

FIG. 3 illustrates the device of FIG. 2 with the damper vanes in an open position;

FIG. 5 illustrates the device of FIG. 2 with the left damper vane open and the right damper vane closed;

FIG. 6 illustrates the device of FIG. 2 with the right damper vane open and the left damper vane closed;

FIG. 8 is a cross-sectional view taken along section line 8—8 of FIG. 7;

FIG. 9 is a perspective view of a damper unit that is part of the air-handling device of FIG. 7;

FIG. 10 is another perspective view of the damper unit of FIG. 9;

FIG. 11 is a top plan view of the damper unit of FIG. 9;

FIG. 12 is a right end view of the damper unit of FIG. 11;

FIG. 13 is a front, elevational view of the damper unit of FIG. 11;

FIG. 19 is a perspective view of one of the damper vanes of the damper unit of FIG. 9;

FIG. 20 is a plan view of the damper vane of FIG. 19;

FIG. 21 is a right end view of the damper blade of FIG. 20;

DETAILED DESCRIPTION

Figure 1:
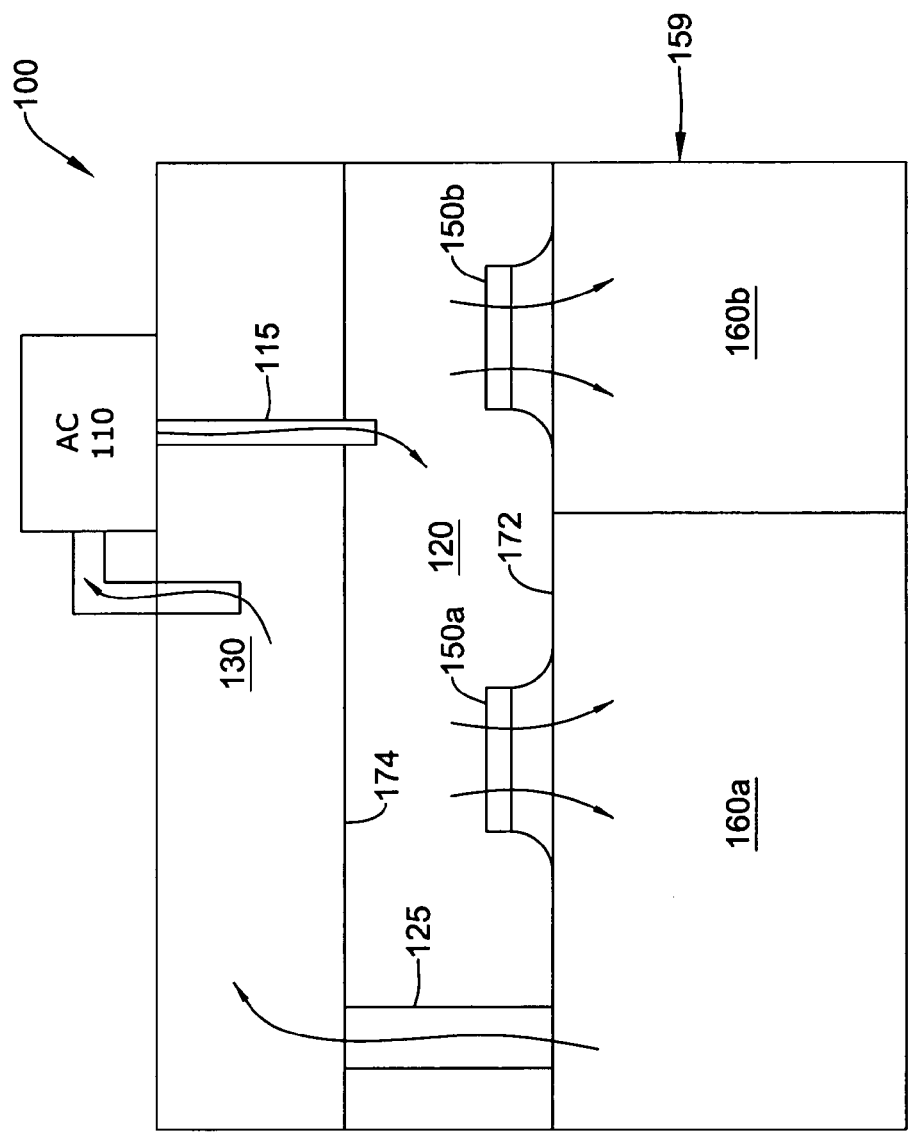
FIG. 1 schematically illustrates a prior art air circulation/conditioning system.

In air handling/circulation systems such as the system 100 of FIG. 1, the dampers 150A, 150B are positioned in close proximity to the underlying floor space 159. Therefore, it is desirable to minimize damper noise that may be distracting to occupants of the underlying space. It is also desirable to minimize the power consumption and size of the motors used to drive the vanes of the dampers. Some aspects of the present disclosure relate to features for overcoming problems associated with air-plenum type air circulation systems. However, it will be appreciated that the various inventive aspects disclosed herein are not limited to the air-plenum field. Quite to the contrary, the various inventive aspects disclosed herein are applicable to any type of air handling system regardless of whether the system utilizes air plenums, ducts or other air conveying means.

Certain inventive aspects of the present disclosure relate to mechanical features provided on a damper vane for minimizing the torque needed to drive the vane between open and closed positions. In one embodiment, the damper vane is aerodynamically shaped to utilize airflow as an energy source that generates supplemental torque for turning the vane between open and closed positions. For example, in one non-limiting embodiment, lips or other structures are provided along edges of the vane, the lips or other structures being configured such that airflow across the vane applies a torque to the vane that supplements torque provided by an actuator motor.

FIG. 2 schematically illustrates an airflow control device 200 having features that are examples of inventive aspects in accordance with the principles of the present disclosure. The device 200 includes a damper frame 202 that defines an airflow passage 204. The airflow passage 204 includes an air entrance end 206 and an air exit end 208. An air diffuser 210 is connected to the air exit end 208 of the damper frame 202. The air diffuser 210 is shown extending between the air exit end 208 of the damper frame 200 and a suspended ceiling 172. The diffuser 210 provides fluid communication between the air exit end 208 of the passage 204 and a floor space desired to be air-conditioned. The air entrance end 206 of the passage 204 is preferably in fluid communication with an air supply plenum such as the plenum 120 of FIG. 1.

The air supply plenum 120 typically is maintained at a predetermined constant temperature and pressure by an air conditioner. For example, in one embodiment, the temperature within the air supply plenum 120 is preferably maintained at a temperature in the range of 50 to 60 degrees Fahrenheit, and the pressure of the air within the air supply plenum 213 is maintained at a range of 0.025 to 0.1 inches of water. In other embodiments, the pressure in the air supply plenum 120 can be maintained in the range of 0.04 to 0.075 inches of water, or at a pressure of about 0.05 inches of water.

Airflow through the air passage 204 is controlled by damper vanes $212_L$, $212_R$. The damper vanes $212_L$, $212_R$ are moveable between closed positions (see FIG. 2) and open positions (see FIG. 3). The damper vanes $212_L$, $212_R$ can also be referred to as damper blades, damper plates, damper members or damper structures. The damper vanes $212_L$, $212_R$ include features that are examples of how vanes in accordance with the principles of the present invention may be designed to convert air flow traveling through the passage 204 into torque for assisting in moving the vanes between open and closed positions.

Each of the vanes $212_L$, $212_R$ is rotatable about a central axis of rotation 216. The vanes $212_L$, $212_R$ include main bodies 218 configured to traverse and block the opening 204 when the vanes $212_L$, $212_R$ are in the closed position of FIG. 2. The main bodies 218 each include inner ends $218_i$ and outer ends $218_o$. As shown in FIG. 2, the inner ends $218_i$ are positioned adjacent one another at a center of the passage 204, and the outer ends $218_o$ are positioned adjacent the sidewalls of the damper frame 202. Structures for catching airflow (i.e., vane turning structures) are positioned at the ends $218_i$, $218_o$ of the main body 218 of the vanes $212_L$, $212_R$. As shown in FIG. 2, the structures for catching airflow includes lips $220_i$, $220_o$ that project outwardly from the main body 218 and are defined along outermost edges of the vanes $212_L$, $212_R$. The lips $220i$, $220o$ project outwardly from opposite sides 225, 227 of the main body 218. The lips $220i$, $220o$ include vane turning surfaces 223 adapted for catching air flow so as to generate torque for rotating the vanes.

As shown in FIG. 2, the lips $220_i$, $220_o$ are aligned at right angles relative to the main bodies 218 such that each lip $220_i$ projects outwardly from the main body 218 in a direction opposite from its counterpart lip $220_o$. In other embodiments, the lips $220_i$, $220_o$ may be aligned at oblique angles relative to the main body 218. Further, in FIG. 2, the lips $220_i$, $220_o$ are shown integral with the main body 218 and would typically be provided by bending the ends of the vanes $212_L$, $212_R$. In other embodiments, the lips $220_i$, $220_o$ can be separate pieces attached or otherwise secured to the main body 218. The lips can also be referred to as bent portions, ridges, transverse portions, projections, extensions or raised edges. In one embodiment, the lips each have heights h that is in the range of 0.05 to 0.25 inches. In other embodiments, the heights h are 1 to 5 percent as long as a width w of a corresponding damper vane. Of course, the sizes can be varied without departing from the broad inventive aspects of the present disclosure.

Referring still to FIG. 2, the left damper vane $212_L$ is rotated in a clockwise direction about the axis of rotation 216 (see arrow 230) to move the vane $212_L$ between the open and closed positions. In contrast, the right vane $212_R$ is rotated in a counterclockwise direction about its axis of rotation 216 (arrow 232) to move the vane $212_R$ between the open and closed positions. The vanes $212_L$, $212_R$ are rotated in opposite directions to take advantage of existing airflow conditions characteristic of an airflow plenum. For example, air flowing from the plenum through the passage 204 will move at a higher velocity adjacent the middle of the passage 204 (indicated by arrows A) as compared to at the sides (indicated by arrows B). This condition creates a force imbalance on the vanes $212_R$, $212_L$ that biases the right vane $212_R$ toward counterclockwise rotation and the left vane $212_L$ towards clockwise rotation, even in the absence of the lips $220_i$, $220_o$. By positioning the lips as so configured in FIG. 2, and by driving the vanes $212_L$, $212_R$ in opposite directions, the existing airflow condition can be further exploited.

The lips $220_i$, $220_o$ are preferably configured to project outwardly from the main bodies 218 in directions that are in opposition to the direction of rotation of the corresponding vane $212_L$, $212_R$. For example, the lips $220_i$, $220_o$ of the left vane $212_L$ project outwardly from the main body 218 in a counterclockwise direction, and the lips $220_i$, $220_o$ of the right vane $212_R$ project outwardly from the main body in a clockwise direction. The vanes $212_L$, $212_R$ are mounted such that when the vanes $212_L$, $212_R$ are closed as shown in FIG. 2, the inner lips $220_i$ project upwardly and the outer lips $220_o$ project downwardly.

To open the vanes $212_L$, $212_R$, vane $212_L$ is rotated in the clockwise direction 230 and the vane $212_R$ is rotated in the counterclockwise direction 232. It will be appreciated that the vanes $212_L$, $212_R$ can be rotated by any number of different types of drive mechanisms. An example drive mechanism includes an electric motor such as a stepper motor.

As the vanes $212_L$, $212_R$ move from the closed position of FIG. 2 to the open position of FIG. 3, air flow impinges on the lips $220_i$ of the vanes $212_L$, $212_R$ thereby providing supplemental force for rotating the blades towards the open position of FIG. 3. The supplemental force is enhanced at least in part by the increased surface area 223 provided by the lips $220_i$ at the inner ends $218_i$ of the vanes $212_L$, $212_R$ and the increased drag characteristics at edges of the vanes.

It is preferred for the drive mechanism rotating the vane $212_L$ to rotate the blade only in the clockwise direction 230. Thus, the vane $212_L$ is rotated in the clockwise direction when moved from the closed position to the open position, and when the vane $212_L$ is moved from the open position back to the closed position. Thus, the inner and outer ends of the vane $212_L$ are constantly alternating. It will be appreciated that the right vane $212_R$ operates in a similar manner. For example, the drive mechanism of the vane $212_R$ drives the vane in the counterclockwise direction when moving the vane $212_R$ from the closed position of FIG. 2 to the open position of FIG. 3, and when moving the vane $212_R$ from the open position of FIG. 3 to the closed position of FIG. 2.

When the vanes $212_L$, $212_R$ are moved from the open position of FIG. 3 to the closed position of FIG. 2, the lips again convert air flow into torque to provide supplemental torque for rotating the blades from the open position to the closed position. For example, airflow impingement on the lips creates unbalanced forces on the vanes $212_L$, $212_R$ which generates the supplemental torque.

Figure 4:
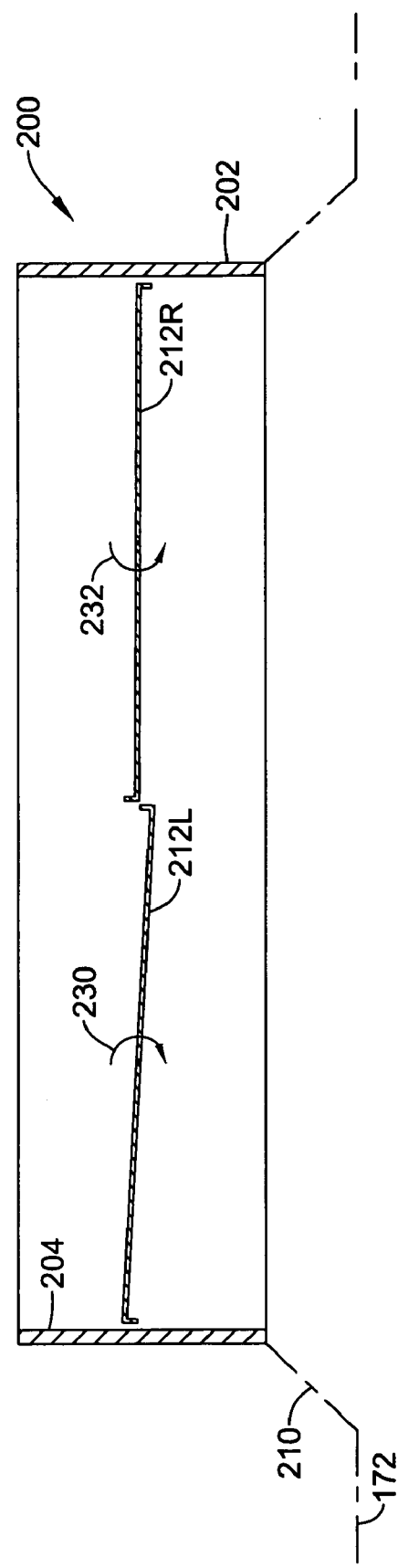
FIG. 4 illustrates the device of FIG. 2 with the damper vanes in a closed but slightly misaligned orientation.

In addition to creating supplemental torque for opening and closing the vanes $212_L$, $212_R$, the lips $220i$ also assist in reducing leakage that may occur between the vanes $212_L$, $212_R$ when the vanes $212_L$, $212_R$ are in the closed position. For example, even if the vanes $212_L$, $212_R$ are slightly misaligned as shown in FIG. 4, the lips $220_i$ maintain a relatively small gap between the edges of the vanes $212_L$, $212_R$.

In certain embodiments, the vanes $212_L$, $212_R$ can be simultaneously rotated between the closed and open positions, and between the open and closed positions. In other embodiments, the opening and closing of the vanes $212_L$, $212_R$ can be sequenced so that the vanes begin rotating a different times or do not rotate at the same time. For example, in one embodiment the damper opening 204 is opened by first rotating the left blade $212_L$ from the closed position to the open position (see FIG. 5). Once the damper vane $212_L$ is in the open position of FIG. 5, rotation of the right damper blade $212_R$ can be initiated to move the right damper blade from the closed position to the open position. Similarly, to close the opening 204, the vane $212_L$ can first be rotated from the open position to the closed position as shown in FIG. 6. Once the vane $212_L$ is closed as shown in FIG. 6, the vane $212_R$ can be closed. By staggering or sequencing rotation of the vanes $212_L$, $212_R$, the maximum power draw required by the unit can be reduced by 50 percent, and noise associated with the opening and closing of the vanes can be reduced. Staggering of the opening and closing of the vanes can be such that the first vane moves completely before the second moves, or alternatively, movement of first vane can be started and then movement of the second vane can be started prior to the first vane reaching its destination (i.e., fully opened or closed). Sequencing of the vane turning can be controlled by a controller using various techniques, such as a timing circuit or timing control logic that interfaces with the vane drive mechanism, or through monitoring the number of steps moved, for example, if a stepper motor is used.

Figure 7:
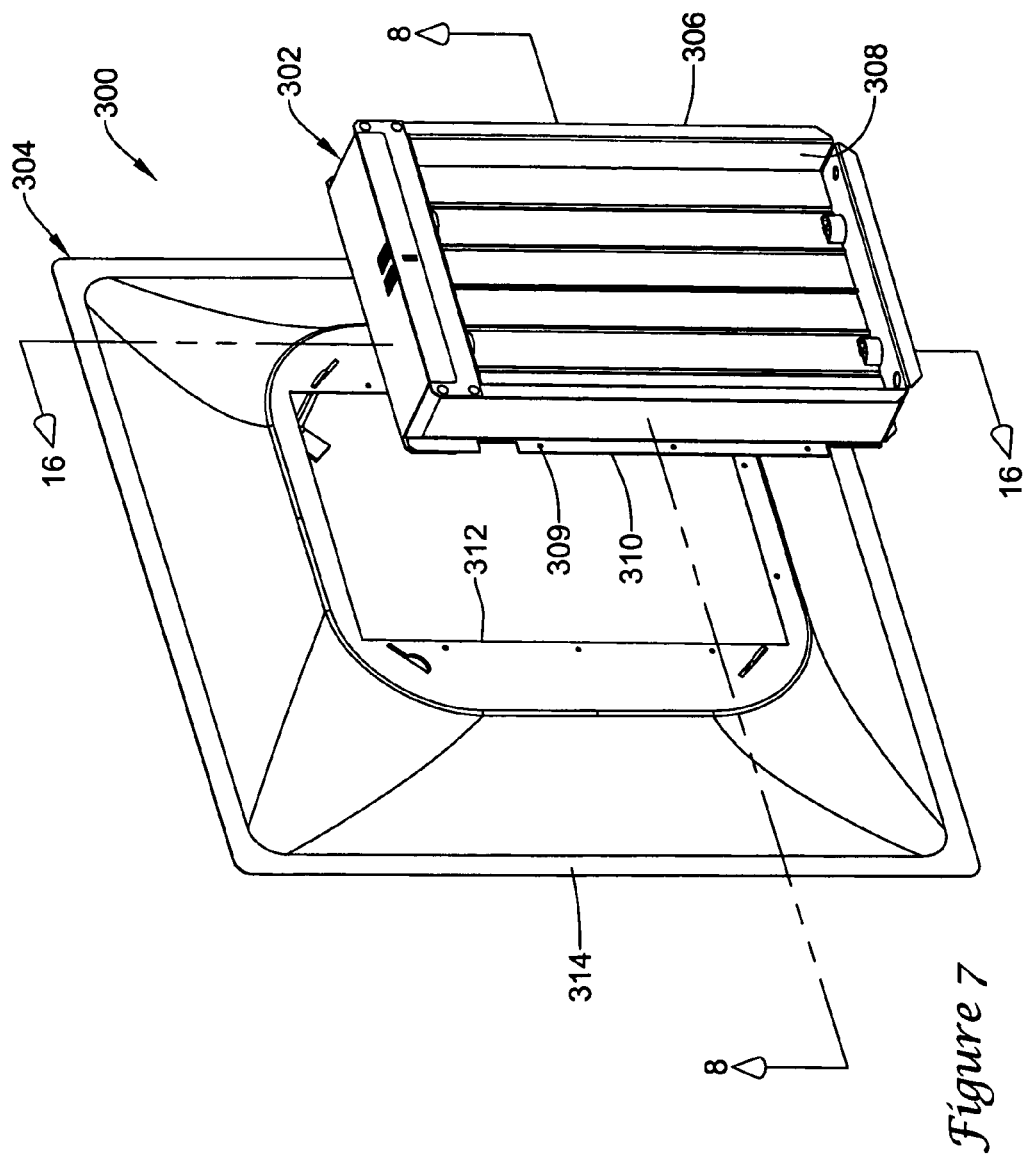
FIG. 7 is a perspective view of another air-handling device having features that are examples of how inventive aspects in accordance with the principles of the present disclosure may be practiced.

FIG. 7 illustrates an air handling device 300 having features that are examples of inventive aspects in accordance with the principles of the present disclosure. The air-handling device 300 includes a damper unit 302 and an air diffuser 304. The damper unit 302 includes a frame 306 defining an airflow opening 308. The frame 306 of the damper unit 302 can be connected to the air diffuser 304 by conventional techniques such as fasteners (e.g., screws, bolts, clips or rivets), welding or a snap-fit connection. As shown in FIG. 7, frame 306 is connected to the air diffuser 304 by fasteners that extend through openings 309 defined by flanges 310 of the frame 306. When the damper unit 302 is secured to the diffuser 304, the airflow opening 308 of the frame 306 aligns with a corresponding opening 312 defined by the air diffuser 304.

As best shown in FIG. 8, the air diffuser 304 includes an outer skirt 314 that tapers outwardly from the opening 312. The air diffuser 304 also includes an inner diffuser structure 316 connected to the outer skirt 314 by hooks 318. In use, the damper unit 302 functions selectively open and close air flow to the air diffuser 304, and the air diffuser functions to diffuse or spread airflow provided to the diffuser through the damper unit 302.

Referring now to FIGS. 9–14, the damper unit 302 is shown in isolation from the air diffuser 304. The frame 306 of the damper unit 302 has a generally rectangular configuration including two opposing major side walls 318, 319 interconnected by two opposing, minor side walls 320, 321. Inner surfaces of the side walls 318–321 define the airflow opening 308 of the damper unit 302.

It will be appreciated that the side walls 318–321 can be manufactured from any number of different types of materials such as metal, plastic or other materials. In the depicted embodiment, side walls 318, 319 and 320 are defined by a first component 322 (e.g., a first piece of bent sheet metal), and the side wall 321 is defined by a second component 324 (e.g., a second piece of bent sheet metal). The second component 322 is fastened to the major side walls 318, 319 by fastening structures such as rivets 326. To increase the rigidity of the frame 306, flanges 310 are provided about the outer perimeter of the frame 306.

Figure 16:
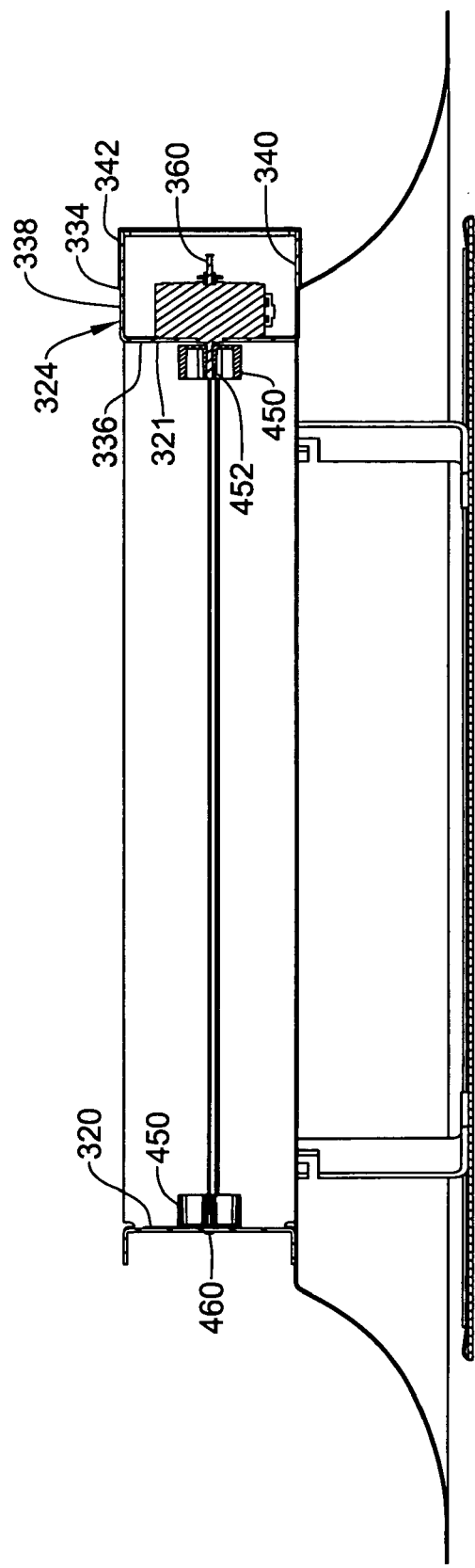
FIG. 16 is a cross-sectional view taken along section line 16—16 of FIG. 7.

The damper unit 302 is equipped with two damper vanes 330 for selectively opening and closing the airflow opening 308. The damper vanes 330 are rotated relative to the frame 306 between open and closed positions by drive motors 332 (see FIG. 14). The drive motors 332 are positioned within a housing 334 located at one end of the frame 306. The housing 334 is defined primarily by the second component 324. For example, as shown in FIG. 16., the component 324 defines an upright wall 336 corresponding to the minor side wall 321 of the frame 306. The second component 324 also includes a top wall 338 and a bottom wall 340. The housing 334 further includes a removable cover 342 that fastens to the top and bottom walls 338, 340 at a location opposite from the upright wall 336. Portions of the major side walls 318, 319 of the frame 306 extend past the upright wall 336 to enclose opposite ends of the housing 334.

Figure 14:
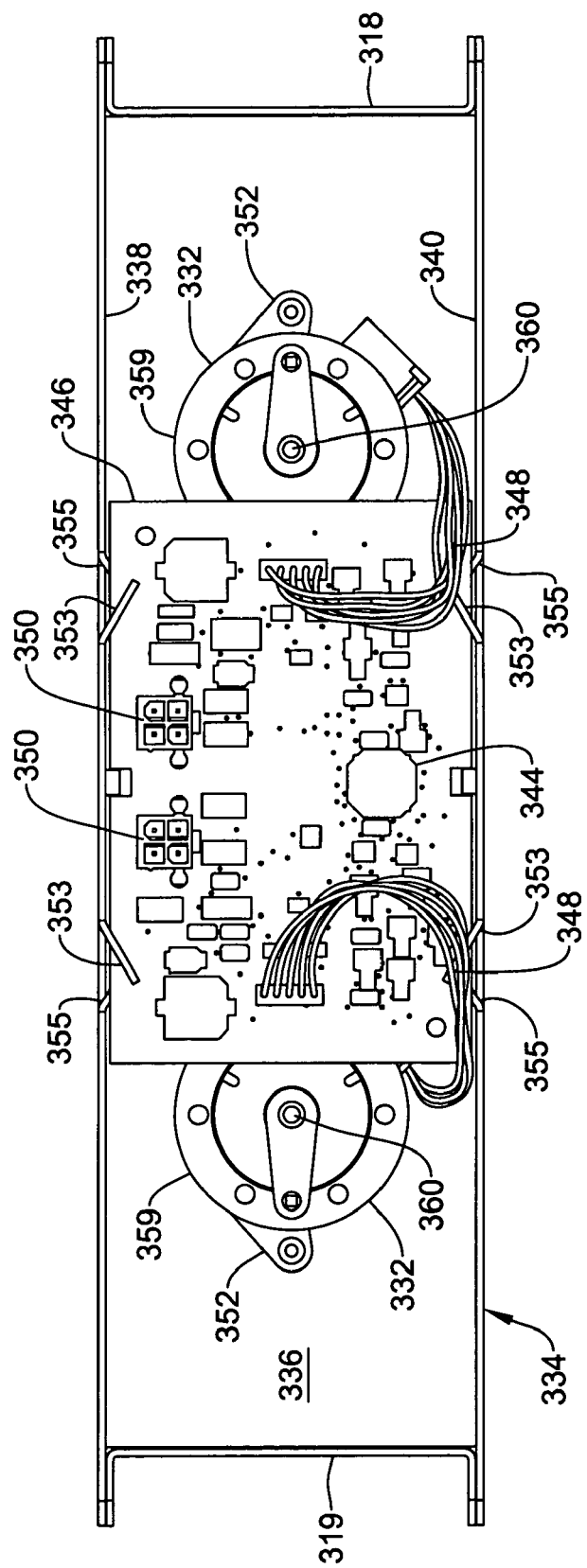
FIG. 14 is a right end view of the damper unit of FIG. 11 with an end cover removed to show an interior of a motor housing.

Referring to FIG. 14, two drive motors 332 are positioned within the housing 334. The motors 332 are controlled by a control device including a microcontroller 344 mounted on a printed circuit board 346. Wires 348 electrically connect the control device to the motors 332. The control device is also equipped with input/output ports 350 mounted on the circuit board 346. The cover 342 can include openings 354 (see FIGS. 9 and 10) for providing ready access to the input/output ports 350 even when the cover is secured to the top and bottom walls 338, 340 of the housing 334. As described in U.S. application Ser. No. 10/632,672, entitled "Bi-Directional Connections for Daisy-Chained Dampers" and filed on a date concurrent herewith, the ports 350 can be used to coupled the control device to a main controller, and/or to daisy chain multiple damper units together. The above-identified application is hereby incorporated by reference in its entirety.

Still referring to FIG. 14, the drive motors 332 are preferably mounted to the upright wall 336. For example, the motors 334 can include casings 359 having mounting flanges 352 for securing the motors 332 directly to the upright wall 336 by conventional fasteners such as rivets, clips, screws, bolts or other fastening techniques. The printed circuit board 346 and wires 348 are preferably mounted within the housing 334. The top and bottom walls 338, 340 of the housing 334 can include sets of inwardly bent tabs 353, 355 (see FIG. 15) for mounting and securing the circuit board 346 within the housing 334. Edges of the circuit board 346 are adapted to be captured between the sets of tabs 354, 355.

While the drive motors 332 can be any type of drive mechanism, preferred drive mechanisms for rotating the vanes 330 include stepper motors. In certain embodiments, the stepper motors preferably have at least 24 steps per shaft revolution. In other embodiments, the stepper motors include at least 48 steps per revolution. Example stepper motors are sold by Minebea Electronics Company of Japan. It is preferred for each stepper motor to be configured to draw less than or equal to one watt of power to generate at least 3½ inch ounces of torque. The drive motors 332 are shown including drive shafts 360 driven by drive mechanisms housed within the casings 359 of the motor 332.

In preferred embodiments, the stepper motors are used to modulate the amount of time that the damper vanes are open for each duty cycle. It is therefore preferably to configure the motor to open and close the vanes in a short amount of time. In one example, each vane can be opened or closed in less than 10 seconds, more preferably less than 5 seconds, and even more preferably less than 2 seconds. In one embodiment, the motors 332 are configured to open or close each vane in about 1 second.

In a preferred embodiment, the drive motors 332 are configured as described in U.S. application Ser. No. 10/632, 669, entitled "Damper Including a Stepper Motor" and filed on a date concurrent herewith. The above-identified application is hereby incorporated by reference in its entirety.

Figure 16A:
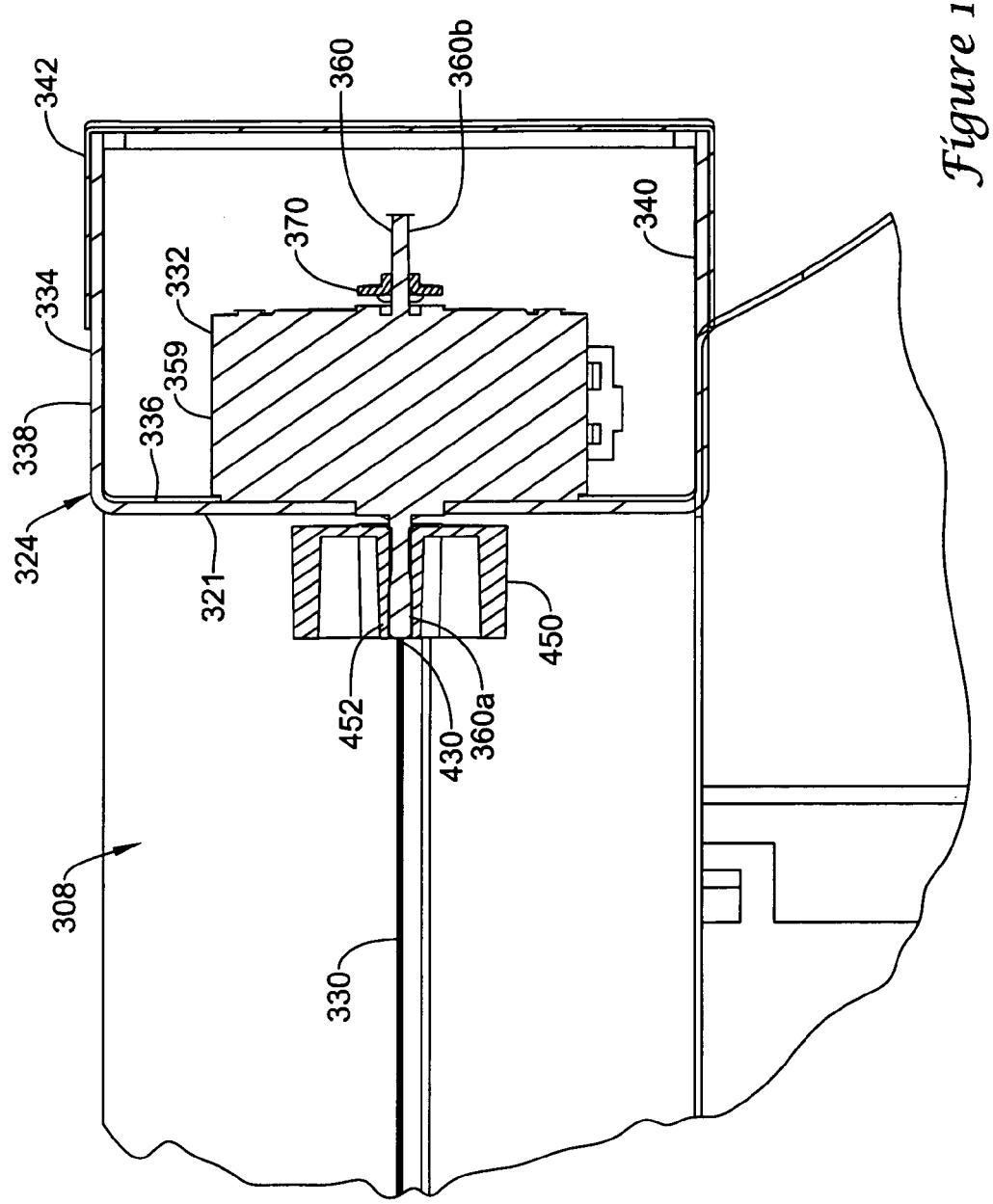
FIG. 16A is an enlarged, detailed view of a portion of FIG. 16.

Referring to FIGS. 16 and 16A, a cross-sectional view through one of the motors 332 is provided. As is apparent from FIG. 16, the motor 332 is mounted directly to the upright wall 336. As indicated previously, the upright wall 336 corresponds to the minor side wall 321 having an inner surface that defines one of the sides of the airflow opening 308. The drive shaft 360 of the motor 332 includes a first end 360A that extends through the upright wall 336 and projects into the airflow opening 308. For example, the first end 360a is shown projecting through an opening 362 in the upright wall 336 so as to extend into the airflow opening 308. The first end 360a of the shaft 360 is preferably connected directly to one of the damper vanes 330. The term "directly connected" is intended to mean that no intermediate gears are provided between the shaft 360 and the vane 330 so that the vane 330 and the shaft 360 rotate at the same rate of rotation. The terms "direct connection" or "directly connected" do include coupling techniques where one or more intermediate pieces are used to fix the shaft 360 relative to the damper vane 330.

Referring to FIGS. 19–21, one of the damper vanes 330 is shown in isolation from the remainder of the damper unit. The depicted damper vane 330 has a generally rectangular shape having oppositely positioned major edges 410, 411 and oppositely positioned minor edges 412, 413. Similar to the vane embodiments described above, the vane 330 includes aerodynamic features for using air flow to generate supplemental torque for rotating the vane. For example, a first lip 415 is shown positioned at the major edge 410, and a second lip 416 is shown positioned at the major edge 411. The lips 415, 416 are shown having lengths that are generally parallel to an axis of rotation 418 of the vane 330. As depicted and FIGS. 19–21, the lips 415, 416 extend along the entire lengths of the major edges 410, 411. However, in alternative embodiments, the lips 415, 416 may extend along only portions of the edges 410, 411, or be arranged in other configurations.

As best shown in FIG. 21, the lips 415, 416 project outwardly from opposite major sides 425, 427 (i.e., major faces) of a main body 409 of the vane 330. The vane 330 also includes integral ribs 419, 420 for reinforcing the main body 409. Rib 419 is positioned between the first lip 415 and the axis of rotation 418 of the vane 330, and projects outwardly from the first major side 425 of the main body 409. Rib 420 is positioned between the second lip 416 and the axis of rotation 418, and projects outwardly from the second major side 427 of the main body 409. As depicted in FIG. 21, the ribs 419, 420 comprise bends (e.g., 90 degree bends) provided in the main body 409.

Referring to FIG. 20, notches 430 are provided at the minor edges 412, 413 of the vanes 330. The notches 430 are positioned at the axes of rotation 418 of the vanes 330 and are provided to facilitate coupling the vanes 330 to drive mechanisms. Each of the notches 430 includes a generally rectangular portion 430a and tapered portion 430b. The notches 430 are defined by notch edges 431.

Figure 17:
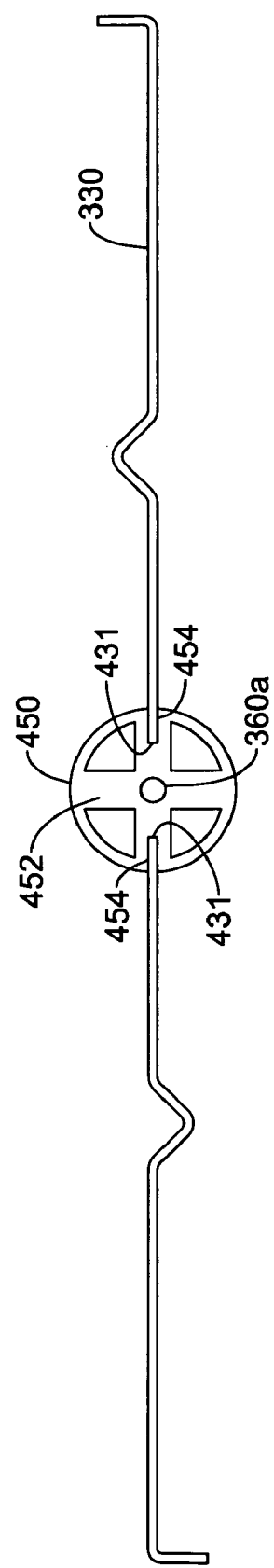
FIG. 17 is a cross-sectional view through one of the damper vanes of the damper unit of FIG. 9.

Referring to FIGS. 16, 16A and 17, hubs 450 are used to provide direct connections between the first ends 460a of the shafts 460 and the minor edges 412 of the damper vanes 330. The hubs 450 are preferably made of a plastic material, but could also be made of other materials. The hubs 450 include center sleeves 452 in which the first ends 460A of the shafts 460 are fixedly mounted such that the hubs 450 and the shafts 460 are not free to rotate relative to one another. For example, the first ends 460a of the shafts 460 can be pressed within the sleeves 452 with splines of the shafts imbedded within the sleeves 452 to prevent relative rotation therein-between.

Referring still to FIG. 16A, the sleeves 452 of the hubs 450 fit within the notches 430 of the vane 330. Also, as shown in FIG. 17, the notch edges 431 fit within slots 454 defined by the hubs 450 to provide a connection between the hub 450 and the vane 330.

Hubs 450 are also used to connect he minor edges 413 of each of the vanes 330 to the frame 306. For example, as shown in FIG. 16, the minor edges 413 of the vanes 330 can be rotatably coupled to the minor side wall 320 of the frame 306 by hubs 450 mounted on pins 460. The pins 460 are preferably pressed through openings in the minor side wall 320. The pins 460 are preferably mounted so as to not rotate relative to the minor side wall 320. The pins 460 fit within the sleeves 452 of the hub 450. The pins 460 are preferably smaller than the openings in the sleeve 452 such that the hubs 450 are capable of rotating freely relative to the pins 460. The hubs 4450 engage the minor edges 413 of the vanes 330 in the same manner described above with respect to the minor edges 412 of the vanes 330.

To assembly the damper unit 302, the motors 332 are first fastened to the upright wall 336 and the shafts 460 are mounted to the minor side wall 320 of the frame 306. The hubs 450 are then mounted on the pins 460 and on the first ends 360A of the drive shaft 360. Next, prior to connecting the first and second components 322, 324 of the frame 306 together, the vanes 330 are mounted in the hubs 450. Thereafter, the first and second components 322, 324 are fastened together thereby preventing the vanes 330 from disengaging from the hubs 450.

Figure 15:
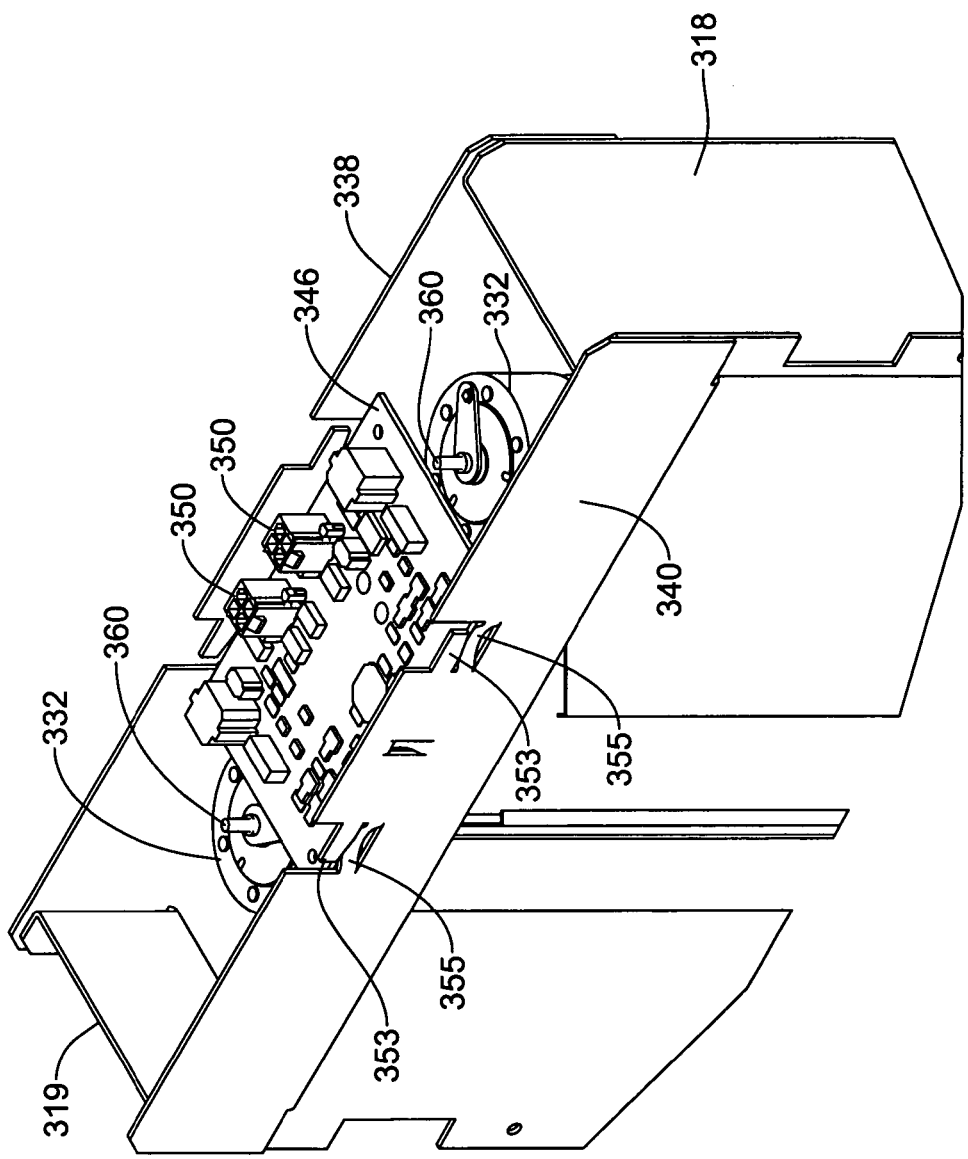
FIG. 15 is a perspective view of the motor housing of FIG. 14.
Figure 18:
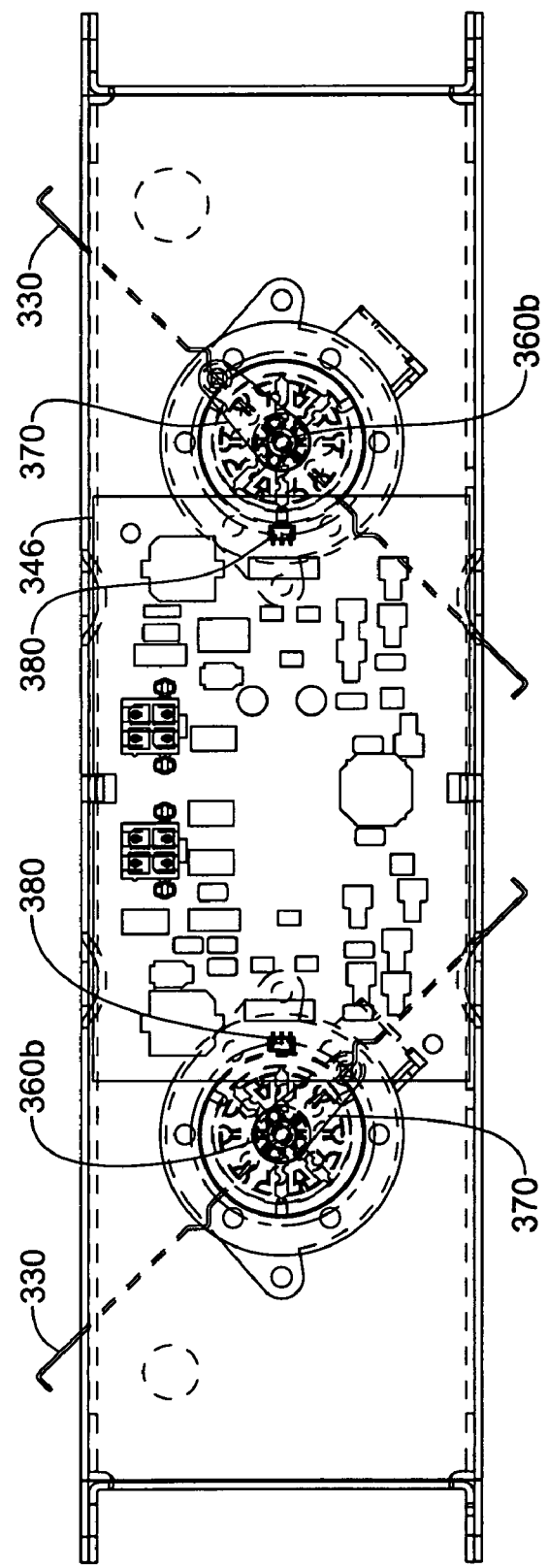
FIG. 18 is a right side view of the damper unit of FIG. 11 with the damper vanes shown in hidden-line.
Figure 23:
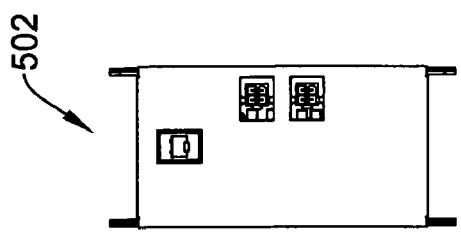
FIG. 23 is a right end view of the damper unit of FIG. 22.
Figure 22:
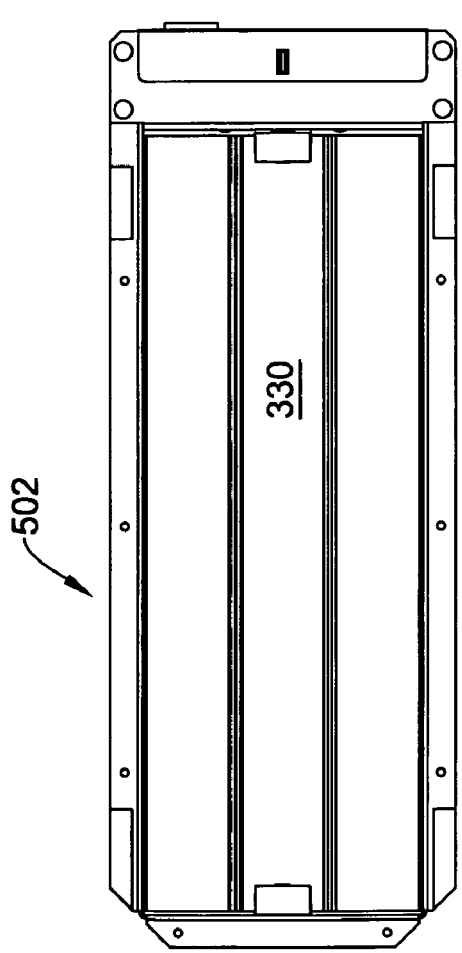
FIG. 22 is a plan view of an alternative damper unit in accordance with the principles of the present disclosure.
Figure 25:
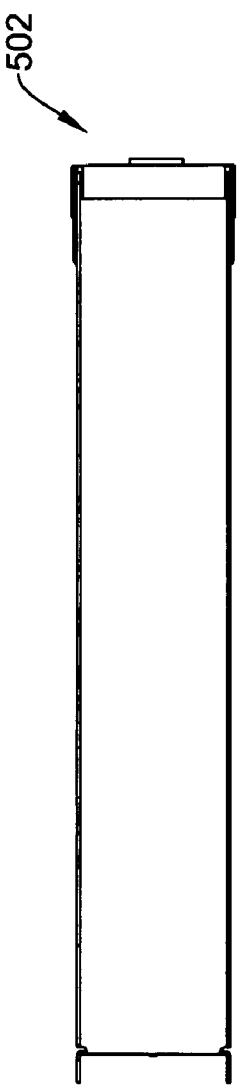
FIG. 25 is a front elevational view of the damper unit of FIG. 22.
Figure 24:
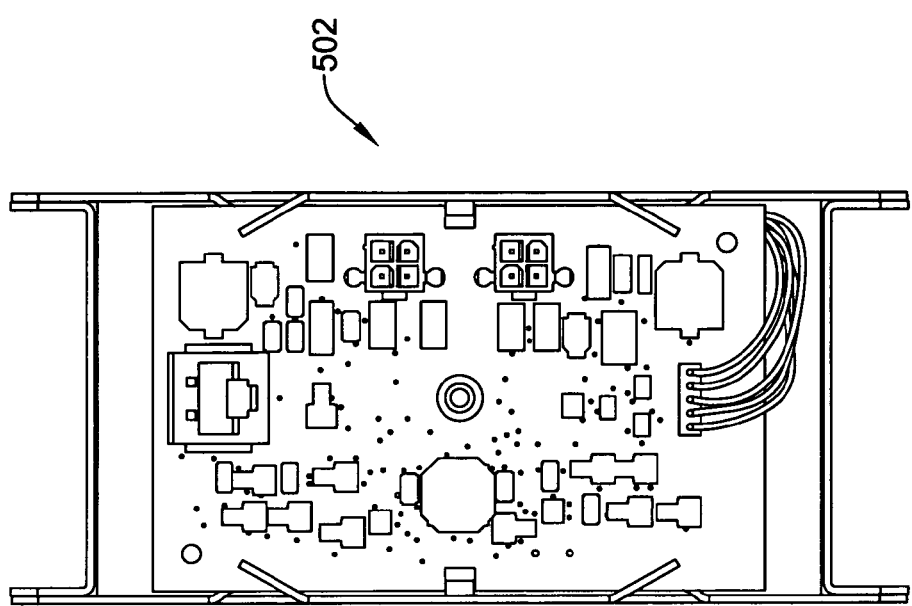
FIG. 24 is a right end view of the damper unit of FIG. 22 with an end cover removed to show the interior of a motor housing.

Referring now to FIGS. 15, 16A and 18, the drive shafts 360 of the drive motors 332 also include second ends 360b that project outwardly from the casings 359 into the housing 334. A rotational position indicator 370 (i.e., a flag) is mounted to the second end 360b. The indicators 370 project perpendicularly outwardly from the shafts 360 and rotate in concert with the shafts 360. As best shown in FIG. 18, portions of each of the motors 332 are positioned beneath the circuit board 346 (i.e., portions of the circuit board 346 cover or overlap the motors 332). With the circuit board 346 so positioned, the rotational position indicators 470 pass beneath the circuit board 346 with each revolution of their corresponding shafts 360. Sensing devices 380 are preferably positioned on the side of the circuit board 346 that faces the motors 332. The sensing devices 380 are adapted to detect each time the rotational position indicators 370 pass by the sensors. In one embodiment, the sensing devices 380 include Hall Effect sensors, and the rotational position indicators 370 include magnets capable of being sensed by the Hall Effect sensors. In other embodiments, the sensor can include an optical sensor, a proximity sensor, or any number of different types of sensors. As described in U.S. application Ser. No. 10/633,333, entitled "Self-Adjusting System for a Damper", filed on a date concurrent herewith, now U.S. Pat. No. 6,880,799, issued Apr. 19, 2005, the sensing devices 380 and indicators 370 provide data regarding the rotational positions of the vanes which is used by the control device to reset or calibrate the step counts of the motors. The above-identified application is hereby incorporated by reference in its entirety.

FIGS. 22–25 illustrate and alternative damper unit 502 that is equipped with only of the damper vanes 330. It will be appreciated that the damper unit 502 operates in a similar manner to the damper unit 302 previously described.

With regard to the forgoing description, changes may be made in detail, especially with regard to the shape, size, and arrangement of the parts. It is intended that the specification and depicted aspects be considered illustrative only and not limiting with respect to the broad underlying concepts of the present disclosure. Certain inventive aspects of the present disclosure are recited in the claims that follow.

We claim:

1. A damper device for an air handling system, the damper device comprising:
   a frame defining an air flow opening;
   first and second damper vanes for opening and closing the air flow opening;
   at least one drive mechanism for turning the damper vanes between open and closed positions, wherein the drive mechanism includes a controller that sequences the opening and closing of the damper vanes such that the first and second damper vanes are not simultaneously moved between the open and closed positions; and
   the damper vanes including a main body and also including vane turning surfaces that project outwardly from the main body, the vane turning surfaces being configured for converting air flow into torque for assisting the drive mechanism in turning the damper vanes between the open and closed positions.

2. The damper device of claim 1, wherein each damper vane is generally rectangular and includes first and second outer edges positioned on opposite sides of an axis of rotation of the vane, wherein the vane turning surfaces are defined by first and second lip structures positioned respectively at the first and second outer edges.

3. The damper device of claim 2, wherein the first and second lip structures extend along entire lengths of the first and second edges.

4. The damper device of claim 2, wherein the main body of each vane includes opposite first and second major sides, and wherein the first lip structure projects outwardly from the first major side and the second lip structure projects outwardly from the second major side.

5. The damper device of claim 4, wherein the first and second lip structures are generally perpendicular to the main body.

6. The damper device of claim 4, wherein the drive mechanism turns the damper vanes in a first direction of rotation, and wherein the first and second lip structures project outwardly from the main body in directions opposite from the first direction of rotation.

7. The damper device of claim 4, wherein each damper vane has a central axis of rotation, and wherein each damper vane includes a first rib positioned between the first lip structure and the axis of rotation and a second rib positioned between the second lip structure and the axis of rotation, the first rib projecting outwardly from the first side of the main body and the second rib projecting outwardly from the second side of the main body.

8. The damper device of claim 1, wherein each damper vane includes first and second outer edges, wherein an axis of rotation of each damper vane is positioned between the outer edges, and wherein the vane turning surfaces are positioned at the outer edges.

9. The damper device of claim 8, wherein the vane turning surfaces project generally perpendicularly outwardly from the main body.

10. The damper device of claim 8, wherein the vane turning surfaces are defined by first and second lip structures that extend respectively along the first and second outer edges of each damper vane.

11. The damper device of claim 10, wherein the first and second lip structures have lengths that are generally parallel to the axis of rotation of the damper vane.

12. The damper device of claim 1, wherein the drive mechanism includes a stepper motor.

13. The damper device of claim 12, wherein the stepper motor is coupled to the damper vanes by a direct connection.

14. A damper device for an air handling system, the damper device comprising:
a frame defining an air flow opening;
at least first and second damper vanes for opening and closing the air flow opening;
a drive mechanism for turning the damper vanes between open and closed positions, wherein the drive mechanism turns the first and second damper vanes in opposite rotational directions to move the damper vanes between the open and closed positions; and
the damper vanes each having a generally rectangular configuration defined by first and second oppositely positioned major edges and first and second oppositely positioned minor edges, the damper vanes also each including a first major side that faces in an opposite direction from a second major side, the damper vanes each further including a first lip positioned at the first major edge and a second lip positioned at the second major edge, the first lips projecting outwardly from the first major sides of the vanes and the second lips projecting outwardly from the second major sides of the damper vanes;
wherein the air flow opening includes an inner portion and an outer portion, and wherein the damper vanes are rotated such that adjacent the inner portion of the air flow opening the damper vanes move with a direction of air flow through air flow opening and adjacent the outer portion the damper vanes move against the direction of air flow through the air flow opening.

15. The damper device of claim 14, wherein the damper vanes include first and second damper vanes, and wherein the drive mechanism includes a controller that sequences the opening and closing of the damper vanes such that the first and second damper vanes are not simultaneously moved between the open and closed positions.

16. The damper device of claim 14, wherein the drive mechanism includes first and second stepper motors for turning the first and second damper vanes.

17. The damper device of claim 16, wherein the first stepper motor is connected directly to the first damper vane and the second stepper motor is connected directly to the second damper vane.

18. The damper device of claim 1, wherein the drive mechanism turns the first and second damper vanes in opposite rotational directions to move the damper vanes between the open and closed positions.

19. The damper device of claim 1, wherein the drive mechanism includes first and second stepper motors for turning the first and second damper vanes.

20. A damper device for an air handling system, the damper device comprising:
a frame defining an air flow opening;
at least first and second damper vanes for opening and closing the air flow opening;
a drive mechanism for turning the damper vanes between open and closed positions; and
the damper vanes each having a generally rectangular configuration defined by first and second oppositely positioned major edges and first and second oppositely positioned minor edges, the damper vanes also each including a first major side that faces in an opposite direction from a second major side, the damper vanes each further including a first lip positioned at the first major edge and a second up positioned at the second major edge, the first lips projecting outwardly from the first major sides of the vanes and the second lips projecting outwardly from the second major sides of the damper vanes;
wherein the drive mechanism includes a controller that sequences the opening and closing of the damper vanes such that the first and second damper vanes are not simultaneously moved between the open and closed positions.

21. A damper device for an air handling system, the damper device comprising:
a frame defining an air flow opening;
at least first and second damper vanes for opening and closing the air flow opening;
a drive mechanism for turning the damper vanes between open and closed positions; and
the damper vanes defined at least in part by first and second oppositely positioned edges, the damper vanes also each including a first major side that faces in an opposite direction from a second major side, the damper vanes each further including a first lip positioned at the first major edge and a second lip positioned at the second major edge, the first lips projecting outwardly from the first major sides of the vanes and the second lips projecting outwardly from the second major sides of the damper vanes;
wherein the drive mechanism includes a controller that sequences the opening and closing of the damper vanes such that the first and second damper vanes are not simultaneously moved between the open and closed positions.

* * * * *